(12) United States Patent
Blaser et al.

(10) Patent No.: US 9,800,098 B2
(45) Date of Patent: Oct. 24, 2017

(54) PUMP UNIT

(75) Inventors: Georg Blaser, Asperg (DE); Pino Broesamle, Asperg (DE)

(73) Assignee: Grundfos Holding a/s, Bjerringbro (DK)

( * ) Notice: Subject to any disclaimer, the term of this patent is extended or adjusted under 35 U.S.C. 154(b) by 483 days.

(21) Appl. No.: 13/884,631

(22) PCT Filed: Nov. 2, 2011

(86) PCT No.: PCT/EP2011/069260
§ 371 (c)(1),
(2), (4) Date: Jul. 23, 2013

(87) PCT Pub. No.: WO2012/062636
PCT Pub. Date: May 18, 2012

(65) Prior Publication Data
US 2013/0294949 A1 Nov. 7, 2013

(30) Foreign Application Priority Data

Nov. 11, 2010 (DE) .......................... 10 2010 051 916
Nov. 11, 2010 (DE) .......................... 10 2010 051 918
Mar. 15, 2011 (EP) ..................................... 11002129

(51) Int. Cl.
*F04D 7/00* (2006.01)
*H02K 7/14* (2006.01)
(Continued)

(52) U.S. Cl.
CPC ............ *H02K 1/146* (2013.01); *F04B 49/06* (2013.01); *F04D 13/06* (2013.01); *F04D 13/064* (2013.01);
(Continued)

(58) Field of Classification Search
CPC ............................... H02K 5/10; H02K 5/1282
(Continued)

(56) References Cited

U.S. PATENT DOCUMENTS 2,811,107 A * 10/1957 Brill ............................... 417/50
3,041,976 A * 7/1962 Maynard ................ H02K 5/128
239/17
(Continued)

FOREIGN PATENT DOCUMENTS

| CN | 101646872 A | 2/2010 |
| CN | 201422057 Y | 3/2010 |

(Continued)

OTHER PUBLICATIONS

The Basement Watchdog, Primary Sump Pumps, by www.PumpStoreUSA.com, 2007.*
(Continued)

*Primary Examiner* — Eduardo Colon Santana
*Assistant Examiner* — Devon Joseph
(74) *Attorney, Agent, or Firm* — Panitch Schwarze Belisario & Nadel LLP

(57) ABSTRACT

A pumping set includes an electric drive motor, which exhibits a stator casing and at least one terminal box connected with the latter, wherein the interior of the terminal box exhibits at least one separating wall, which divides an interior space of the terminal box into at least one electronics area with electronic components and a connection area, wherein the connection area incorporates both electrical connections for at least one connection line along with contacts for establishing an electrical connection with electrical or electronic components arranged inside the stator casing.

12 Claims, 3 Drawing Sheets

(51) Int. Cl.
| | |
|---|---|
| H02K 1/14 | (2006.01) |
| F04D 15/02 | (2006.01) |
| F04D 29/046 | (2006.01) |
| H02K 21/16 | (2006.01) |
| H02K 21/24 | (2006.01) |
| F04D 13/06 | (2006.01) |
| G05D 9/12 | (2006.01) |
| H02P 6/182 | (2016.01) |
| F04B 49/06 | (2006.01) |
| H02K 1/27 | (2006.01) |
| H02K 3/28 | (2006.01) |
| H02K 9/197 | (2006.01) |
| H02K 11/33 | (2016.01) |
| H02K 1/18 | (2006.01) |
| H02K 5/10 | (2006.01) |
| H02K 5/128 | (2006.01) |
| H02K 5/173 | (2006.01) |
| H02K 5/22 | (2006.01) |
| H02K 5/24 | (2006.01) |

(52) U.S. Cl.
CPC ..... *F04D 15/0218* (2013.01); *F04D 29/0467* (2013.01); *G05D 9/12* (2013.01); *H02K 1/148* (2013.01); *H02K 1/2753* (2013.01); *H02K 3/28* (2013.01); *H02K 5/128* (2013.01); *H02K 5/22* (2013.01); *H02K 9/197* (2013.01); *H02K 11/33* (2016.01); *H02K 21/16* (2013.01); *H02K 21/24* (2013.01); *H02P 6/182* (2013.01); *H02K 1/182* (2013.01); *H02K 5/10* (2013.01); *H02K 5/1282* (2013.01); *H02K 5/1737* (2013.01); *H02K 5/225* (2013.01); *H02K 5/24* (2013.01)

(58) Field of Classification Search
USPC .......................................... 318/563; 361/837
See application file for complete search history.

(56) References Cited

U.S. PATENT DOCUMENTS

| | | | |
|---|---|---|---|
| 3,576,378 A * | 4/1971 | Hilmanowski | A47L 15/4225 134/186 |
| 3,746,472 A * | 7/1973 | Rupp | F04D 15/0263 277/320 |
| 3,814,963 A | 6/1974 | Laing | |
| 3,897,172 A * | 7/1975 | Hall | F04B 49/025 200/404 |
| 3,909,644 A * | 9/1975 | Wieser | H02K 5/128 310/53 |
| 4,043,706 A | 8/1977 | Walker | |
| 4,051,401 A | 9/1977 | Hayward | |
| 4,352,646 A | 10/1982 | Laing et al. | |
| 4,471,253 A | 9/1984 | Laing | |
| 4,772,830 A * | 9/1988 | Kobari et al. | 318/563 |
| 5,218,827 A * | 6/1993 | Pevzner | F04D 29/66 62/50.1 |
| 5,408,154 A * | 4/1995 | Meiser | B25J 17/0241 174/50.52 |
| 5,552,653 A | 9/1996 | Nose | |
| 5,610,458 A * | 3/1997 | Baker et al. | 310/68 R |
| 6,229,232 B1 * | 5/2001 | Roth-Stielow et al. | 310/52 |
| 7,015,603 B2 | 3/2006 | Barrho et al. | |
| 7,855,486 B2 | 12/2010 | Hasegawa | |
| 2002/0098089 A1 | 7/2002 | Forsberg | |
| 2005/0225192 A1 | 10/2005 | Kloepzig et al. | |
| 2006/0245956 A1 * | 11/2006 | Lacroix | F04D 13/0666 417/423.1 |
| 2008/0007126 A1 | 1/2008 | Popov et al. | |
| 2009/0159262 A1 * | 6/2009 | Gay | E21B 43/128 166/105 |
| 2010/0090635 A1 | 4/2010 | Andersen et al. | |
| 2010/0102684 A1 * | 4/2010 | Dykes | H02K 5/225 310/68 R |
| 2010/0111729 A1 | 5/2010 | Andersen et al. | |
| 2010/0251974 A1 * | 10/2010 | Showen | E03B 7/04 122/14.3 |
| 2011/0157862 A1 * | 6/2011 | Ellegaard | H01H 9/02 361/837 |
| 2011/0241454 A1 | 10/2011 | Staehr | |
| 2012/0308401 A1 * | 12/2012 | Knedler | F04D 15/0088 417/1 |

FOREIGN PATENT DOCUMENTS

| | | |
|---|---|---|
| DE | 2242653 A1 | 3/1973 |
| DE | 2262867 A1 | 7/1974 |
| DE | 3436510 A1 | 4/1986 |
| DE | 4225148 A1 | 2/1994 |
| DE | 19617083 A1 | 10/1997 |
| DE | 19646617 A1 | 5/1998 |
| DE | 102004017507 A1 | 10/2005 |
| DE | 102004027744 A1 | 12/2005 |
| DE | 102006026719 A1 | 12/2007 |
| DE | 102007042186 A1 | 3/2009 |
| DE | 202007018771 U1 | 3/2009 |
| DE | 102009048889 A1 | 5/2010 |
| EP | 0688088 A1 | 12/1995 |
| EP | 1063751 A1 | 12/2000 |
| EP | 1203886 A2 | 5/2002 |
| EP | 1947343 A1 | 7/2008 |
| EP | 1947753 A1 | 7/2008 |
| EP | 2040350 A2 | 3/2009 |
| JP | 2003-018797 A | 1/2003 |
| WO | 9305564 A1 | 3/1993 |
| WO | 9835424 A1 | 8/1998 |
| WO | 03103114 A1 | 12/2003 |
| WO | 2008019818 A1 | 2/2008 |
| WO | 2008135103 A1 | 11/2008 |
| WO | 2008150334 A1 | 12/2008 |
| WO | 2009006927 A1 | 1/2009 |
| WO | 2009012883 A2 | 1/2009 |
| WO | 2010031468 A1 | 3/2010 |

OTHER PUBLICATIONS

Basement Watchdog Sump Pumps Instruction Manual & Safety Warnings, Chrome Series, by Glentronics, Inc. 640 Heathrow Drive, Lincolnshire, IL 60069. Published date by Glentronics, Inc. 2007.*
Int'l Search Report and Written Opinion dated Mar. 5, 2013 in Int'l Application No. PCT/EP2011/069261.
Int'l Search Report and Written Opinion dated Feb. 20, 2013 in Int'l Application No. PCT/EP2011/069260.
Int'l Search Report and Written Opinion dated Mar. 8, 2013 in Int'l Application No. PCT/EP2011/069340.
Int'l Search Report dated Mar. 15, 2013 in Int'l Application No. PCT/EP2011/069264.
Int'l Search Report dated Mar. 1, 2013 in Int'l Application No. PCT/EP2011/069262.
Office Action dated Apr. 1, 2011 in DE Application No. 10 2010 051 916.2.
Office Action dated Nov. 28, 2011 in DE Application No. 10 2010 051 918.9.
English translation of an Office Action dated Feb. 4, 2015 in CN Application No. 201180064800.4.
Office Action dated Mar. 12, 2015 in CN Application No. 201180063886.9.
Office Action and Search Report dated Mar. 2, 2015 in CN Application No. 201180064776.4.
Office Action dated Jul. 17, 2015 in CN Application No. 201180064776.4.

* cited by examiner

PUMP UNIT

CROSS-REFERENCE TO RELATED APPLICATIONS

This application is a Section 371 of International Application No. PCT/EP2011/069260, filed Nov. 2, 2011, which was published in the German language on May 18, 2012, under International Publication No. WO 2012/062636 A2 and the disclosure of which is incorporated herein by reference.

BACKGROUND OF THE INVENTION

Embodiments of the invention relate to a pumping set with an electric drive motor, which exhibits a stator casing and at least one terminal box connected with the latter.

Pumping sets, for example recirculation pumping sets, such as heating recirculation pumps or industrial water recirculation pumps, normally exhibit an electric drive motor arranged in a tubular stator casing, wherein an axial end of the stator casing is connected with a pump housing, in which at least one impeller rotates to convey a liquid. In known pumping sets, an electronics housing or terminal box is most often arranged on the outside of the stator casing, and incorporates electrical connection elements and electrical and/or electronic components for controlling the drive motor. In particular, the electronic components can encompass a frequency inverter. Such a terminal box can be situated circumferentially or even axially on the end of the stator casing facing away from the pump housing.

The terminal boxes of such pumping sets can exhibit a mating area for electrical connection, into which an electrical connection cable with a corresponding plug can be inserted. Known as an alternative are terminal boxes that have a detachable cover on their exterior side, and a cable bushing in a wall. A cable can be guided through this cable bushing into the interior of the terminal box, and then be hooked up to terminal clamps with the cover removed inside the terminal box. In addition, the terminal boxes exhibit electrical connections for connection with the coils of the stator inside the stator casing. Also known for this purpose are plug contacts, which must be arranged on the side of the terminal box facing the stator casing.

In other words, the terminal box must exhibit several openings for the electrical connection elements and a cover for hooking up a connection line on its exterior. This requires a complicated structural design. However, establishing a tight seal is especially problematic, since gaskets must be provided at each opening to prevent moisture from penetrating into the terminal boxes.

It is therefore desirable to improve a pumping set in such a way that the terminal box can be easily contacted with both the coils inside the stator casing and with an electrical connection line, and in addition can be easily sealed.

BRIEF SUMMARY OF THE INVENTION

The pumping set according to embodiments of the invention exhibits an electric motor in a known manner, which is arranged in a stator casing. The stator casing incorporates a stator with electric coils. A rotor rotates inside the stator, and is in turn secured in a torque-proof manner to at least one impeller of the pumping set by way of a shaft or in some other suitable way. In addition, a can or separating calotte can be arranged between the rotor and stator, so as to design the drive motor as a wet electric motor. The electric drive motor further exhibits a terminal box, which is joined with the stator casing on its exterior side. The terminal box can here be secured radially or axially to the stator casing.

According to embodiments of the invention, the terminal box is designed in such a way that its interior exhibits at least one separating wall. The latter divides the interior space of the terminal box bordered by the outer walls of the terminal box into at least two areas, specifically into an electronics area and a connection area. The electrical and electronic components usually situated in such terminal boxes are arranged in the electronics area. In particular, these can be electronic components for controlling the motor, for example parts of a frequency inverter, or for adjusting the voltage for the drive motor. The electrical connections for hooking up the terminal box are arranged in the connection area. On the one hand, the connection area accommodates the electrical connections for at least one connection line, for example a power cable. On the other hand, however, the invention provides that the same connection area also have contacts for establishing an electrical connection with electrical or electronic components, which are located inside the stator casing. For example, these include the stator coils, along with other electrical or electronic components inside the stator casing. In other words, the connection area also accommodates the electrical connections for hooking up the terminal box with the stator inside the stator casing. The advantage to this is that two essential electrical connections exhibited by such a terminal box, specifically the connections for a power supply connection line and the connections for hooking up the stator, are installed in a shared connection area of the terminal box separated from the remaining electronic components. This makes it easier to seal the terminal box, since only this connection area has to be sealed to the outside. No additional connection area is required that has to be sealed with a detachable cover, as provided in known arrangements for electrically connecting the terminal box with a connection line.

The separating wall ideally forms a closed electronics area in the remaining area of the terminal box, so that the other electronic components inside the electronics area are protected, even if the connection area for hooking up a connection line with the electrical connections situated therein must be opened.

It is especially preferred that the connection area be facing the stator casing. This is advantageous, since as described above, the connection area also accommodates contacts for establishing an electrical connection with the electronic and/or electrical components arranged inside the stator casing. In this way, these contacts can be directly engaged with corresponding contacts or connections on the stator casing.

It is further preferred that the connection area have an open design toward the stator casing, and be tightly closed by the adjacent stator casing or a cover that seals the stator casing. The advantage to this is that the connection area can be opened very easily by removing the terminal box from the stator casing. The connection area in the terminal box is then accessible from the side otherwise facing the stator casing, so that a connection line can be hooked up there. By placing the terminal box on the stator casing, the connection area of the terminal box is then sealed to the outside. To this end, it is further preferred that a gasket be arranged between the terminal box and stator casing or a cover sealing the stator casing, which serves to seal the connection area to the outside, so that no moisture can penetrate into this area from outside, and hence into the interior of the terminal box or into the stator casing.

It is especially preferred for the terminal box to be secured to an axial face of the stator casing. The terminal box can here exhibit an outer shape corresponding to the outer shape of the stator casing, so that a harmonious transition can be achieved between the stator casing and terminal box. The stator casing is preferably tubular in design with a circular cross section. The terminal box can correspondingly also be circular in design, and have the same diameter as the axial end of the stator casing, so that the terminal box can be attached flush with the axial end of the stator casing. The advantage to the round or circular shape is that the contact surface between the stator casing and terminal box can be very easily sealed by a circumferential gasket. The latter can be designed as an O-ring, or, for example, also be injection molded to the terminal box or stator casing. This makes sense in particular when the stator casing and/or terminal box are made out of plastic.

The electrical connections for the connection line inside the connection area are preferably designed as terminal clamps or plug contacts. As a result, the connection line can ideally be contacted with the electrical connections without any tools.

The terminal clamps or plug contacts required for this purpose preferably extend through the separating wall. In other words, the terminal clamps or plug contacts are connected in an electrically conductive manner with electrical or electronic components inside the electronics area. It is especially preferred that the terminal clamps or plug contacts be arranged directly on a circuit board, which is located in the electronics area. The terminal clamps or plug contacts can then extend through the separating wall in such a way that those areas of the terminal clamps or plug contacts that have to be contacted with a connection line are located in the connection area of the terminal box. Necessary operating elements such as levers for opening and/or closing the terminal clamps are then preferably also situated in the connection area. In this way, the connection line can be connected with terminal clamps or plug contacts without having to open up the electronics area. However, the terminal clamps simultaneously establish the electrical connection in the electronics area. Further, the arrangement of terminal clamps and plug contacts is very simple, since these can be placed with additional electrical and electronic components on a circuit board situated in the electronics area. In order for the terminal clamps or plug contacts to be able to extend through the separating wall, the latter can have an opening. If necessary, a gasket can also be arranged in the area of this opening. As an alternative, the terminal clamps or plug contacts could also be formed directly in the separating wall, and the side of the separating wall facing the electronics area could then be attached to a circuit board situated there. In this way, the number of required components could be reduced.

The terminal clamps for hooking up the connection line preferably exhibit a lever for opening the clamps. In order to open the clamps, the lever is preferably opened against a spring preload, thereby releasing connection openings of the clamps, into which the conductors of a connection line are inserted. When the lever is released, it is then preferably moved back to its original position by the spring action, and the conductors of the connection cable are clamped in the interior. The lever is preferably arranged in such a way that it can be moved toward a cable bushing in a wall of the terminal compartment for opening purposes. The terminal clamp here is preferably situated opposite the cable bushing, so that the openings into which the cable conductors are inserted lie opposite the cable bushing. If the lever must then be pressed in the direction of the cable bushing for opening the clamps, the resultant advantage is that the lever with the terminal box can be gripped with one hand and moved toward the cable. The lever can here very easily be held in the open position.

It is further preferred that the contacts for establishing an electrical connection with the electrical or electronic components inside the stator casing be designed as plug contacts, which engage with corresponding plug contacts on the stator or stator casing. This makes it possible to very easily plug the terminal box onto the stator casing, wherein the plug contacts between the terminal box and stator engage each other in an electrically conductive manner. It is advantageous in particular if the terminal box must also be removed from the stator casing in order to hook up the connection line, since this connection can in this way be easily disconnected and reconnected once again.

It is best that the connection area adjoin an outer wall of the terminal box, which incorporates at least one cable bushing. This is here preferably an outer wall facing away from the stator casing. If the terminal box is secured to the axial face of the stator casing, the terminal casing can be pot-shaped, wherein it is secured on its open side to the face of the stator casing. The cable bushing is then preferably formed in a circumferential wall of the terminal box. In this regard, the connection area then preferably adjoins the open side facing the stator casing and this circumferential wall with the cable bushing.

The cable bushing can exhibit a gasket and/or cable relief for the connection cable in a known manner.

In addition to the electrical connections described above, the connection area can also accommodate operating elements. For example, a setting element for setting the speed of the drive motor can be arranged there. Such a setting element can here be designed in such a way that it can be actuated or set from the connection area, and extends through the separating wall into the electronics area, which then incorporates a corresponding electrical or electronic component that converts an actuation into an electrical variable. For example, a potentiometer can here be provided, which can be turned by way of an adjusting screw arranged in the connection area. To this end, the adjusting screw or a shaft can extend through the separating wall.

In another preferred embodiment, the separating wall in at least one section extends at an inclination to the exterior sides, in particular to the faces of the terminal box. As a result, the connection area can be made to exhibit a greater height in the region where a cable bushing ends than in the other regions. The cable bushing region may require a greater height or depth for the connection area, since the cable bushing is preferably arranged in a lateral or circumferential wall of the terminal box.

As described, the terminal box is preferably pot-shaped in design with an open side, which is sealed by the stator casing or a cover that tightly closes the stator casing. To this end, the open side of the terminal box is placed on the stator casing, preferably on its axial face. The circumference of the opening in the terminal box can incorporate a gasket or a sealing surface, against which a gasket arranged on the stator casing comes to abut so as to form a seal. In this pot-shaped configuration, the separating wall preferably extends at an inclination relative to the open face of the pot. As a result, a connection area can be established that exhibits a greater axial height on the side of the cable bushing, which preferably is provided on a circumferential wall of the pot, so that the cable can be introduced into the connection area from this side. It is further preferred that the inclined separating wall here lie opposite the cable bushing, so that a cable pushed into the cable bushing from outside is preferably directionally diverted by the inclined separating wall, making it easy to grasp from the opening of the terminal box and introduce into a terminal clamp.

The separating wall is preferably a separate component that is placed in the terminal box, and preferably joined with the walls of the terminal box via a latching connection. This makes the terminal box easy to manufacture and assemble. In this way, the electronic components can be initially arranged in the electronics area or on the separating wall, and the separating wall can then be placed in the terminal box, as a result of which the electronics area is sealed and separated from the connection area. If necessary, a gasket for sealing the electronics area can be situated between the separating wall and adjacent wall of the terminal box. Joining by way of latching connections enables a very easy assembly.

In a particular embodiment of the invention, the separating wall carries at least one circuit board arranged in the electronic compartment. This simplifies assembly even further, since the circuit board can be attached to the separating wall before this separating wall is inserted, and then placed along with the separating wall into the terminal box. This eliminates the need to separately fix and assemble the circuit board inside the terminal box. In addition, a connection, in particular a connector plug for connection with the electrical or electronic components inside the stator casing, can also be formed on the separating wall. This electrical connection can then be hooked up directly with the circuit board on the other side of the separating wall. However, it is especially preferred that the circuit board be able to extend through an opening in the separating wall with a segment that forms a plug contact. This is preferably a lateral or frontal edge of the circuit board, wherein electrical contacts are formed on this frontal or lateral edge adjacent to one or two opposing surfaces of the circuit board, and can be contacted with a connector plug on the stator casing.

As described above, the pumping set is preferably a recirculation pumping set, in particular a heating or industrial water recirculation pumping set. The drive motor can preferably be a canned motor or spherical motor with a separating calotte. In such a canned motor, a can that separates the stator chamber from the rotor chamber is arranged between the stator and rotor. In terms of the invention, a can is here to be construed as any element suitable for separating the rotor chamber and stator chamber, regardless of its shape. For example, a can may also be disk or dome-shaped in design.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

The invention will be exemplarily explained below based on the attached drawings.

Figure 1:
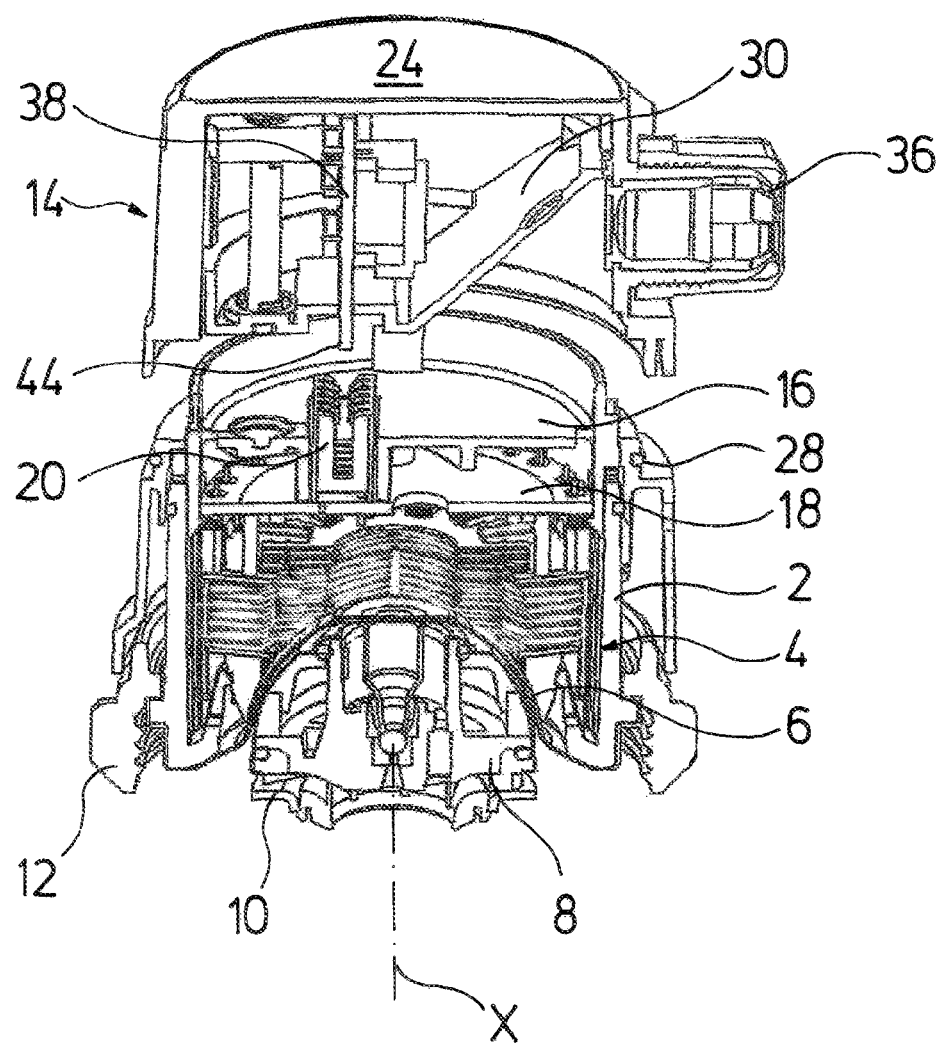
Figure 2:
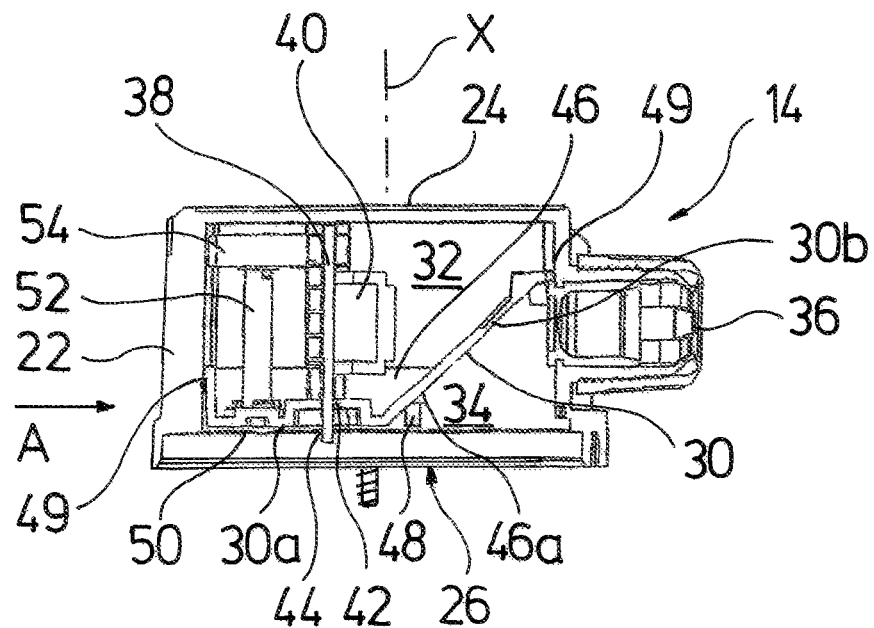
Figure 3:
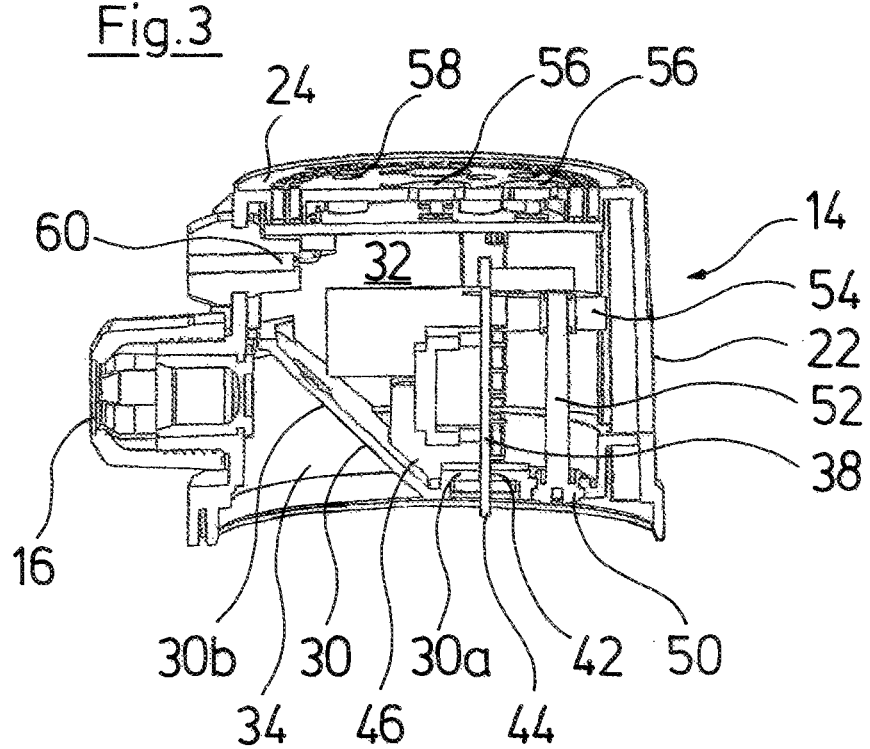
Figure 4:
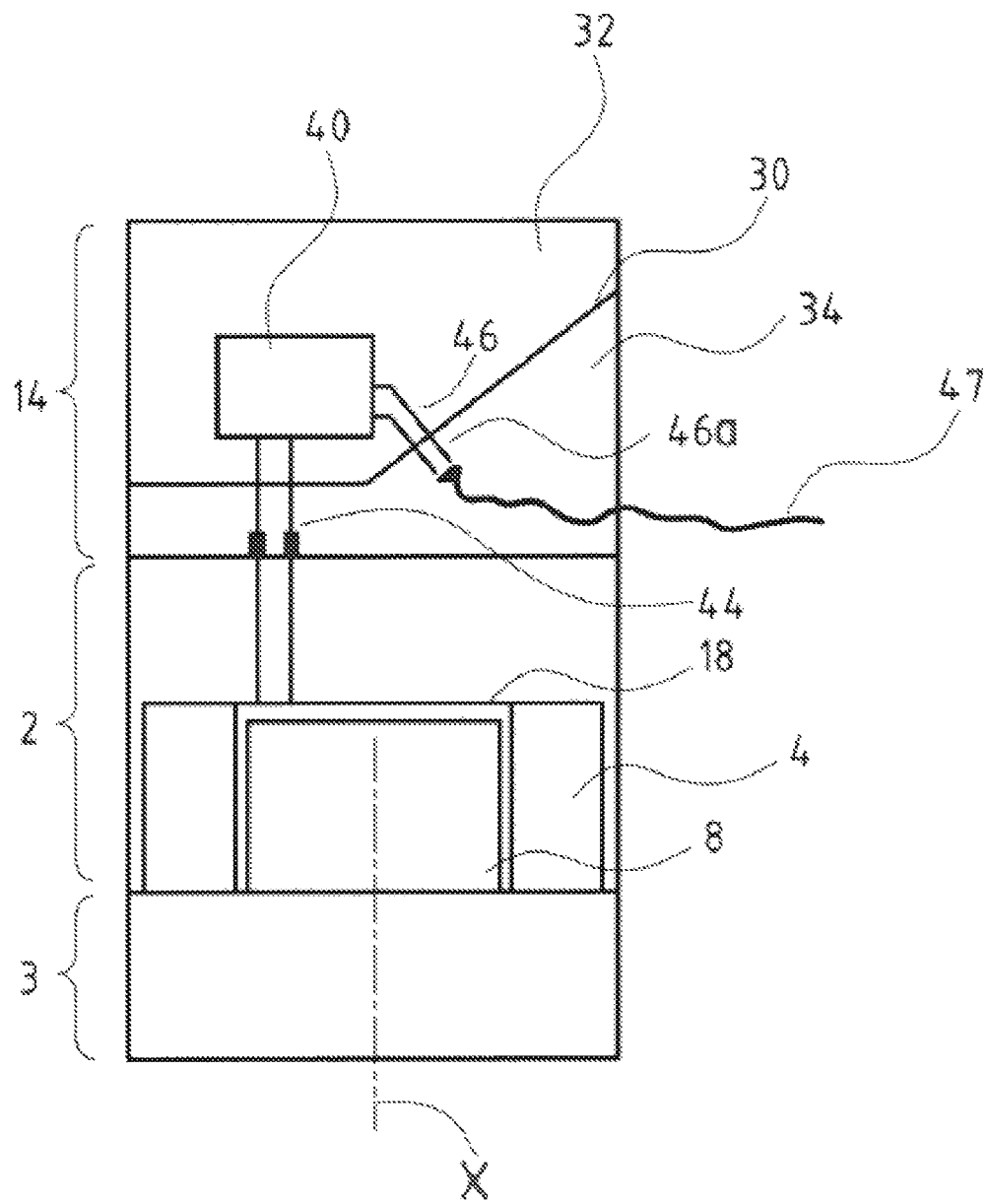

Shown on:

In the drawings:

FIG. 1 is a is a partially exploded side view of a pumping set according to an embodiment of the invention;

FIG. 2 is a is a sectional view of the terminal box of the pumping set according to FIG. 1;

FIG. 3 is a is a sectional view of a terminal box according to an alternative embodiment; and FIG. 4 is a schematic view of the pumping set of FIG. 1.

DETAILED DESCRIPTION OF THE INVENTION

The pumping set on FIG. 1 includes a stator casing 2 in a known manner, which is essentially tubular in design, and whose interior accommodates a stator 4 with the usual iron parts and stator coils. The stator 4 envelops a separating calotte or a can 6, which simultaneously encloses the axial end of the stator casing 2, in that it is outwardly bent and crimped around the axial face of the stator casing 2. A rotor 8 is rotatably mounted inside the can 6. The embodiment depicted here involves a spherical motor, in which the rotor 8 is semispherical, and the can 6 in the form of a separating calotte is correspondingly semispherical or dome-shaped in design. An impeller 10 is integrated into the rotor 8. It engages into a pump housing 3 FIG. 4. The stator casing 2 is joined with the pump housing 3 by way of a retainer nut 12. A pot-shaped terminal box 14 is secured to the stator casing 2. In the exemplary embodiment shown here, the stator casing 2 is additional sealed on this axial side by a cover 16. However, let it be understood that the stator casing 2 could also be directly sealed by the terminal box 14. The terminal box has a diameter that essentially corresponds to the outer diameter of the stator casing 2 or its cladding. Overall, this yields a pumping set that is essentially cylindrical.

Also situated inside the stator casing 2 is a circuit board 18 that electrically contacts the coils of the stator 4 and, if necessary, carries electronic or electrical components, for example of an engine controller. The circuit board 18 is provided with a connector plug 20, which extends through the cover 16. The connector plug 20 is used for contacting the electrical and electronic components inside the terminal box 14.

The terminal box 14 of the pumping set depicted in an individual view on FIG. 2 exhibits a pot-shaped outer wall comprised of an annular circumferential wall 22 and a transversely extending floor 24. The circumferential wall 22 extends around the longitudinal or rotational axis X, and the floor 24 essentially extends transversely hereto at an axial end of the circumferential wall 22. The circumferential wall 22 and floor 24 are preferably designed as a single piece and made out of plastic. The terminal box 14 has an open design at the axial end 26 opposite the floor 24. The open axial end 26 is sealed by the stator casing 2 when the latter is joined with the terminal box 14. To this end, the stator casing has allocated to it a circumferential gasket 28, which comes to tightly abut against the inner circumference of the circumferential wall 22 in the area of the axial end 26.

A separating wall 30 is situated inside the terminal box 14. It divides the interior space of the terminal box 14 into two areas, specifically an electronics area 32 and a connection area 34. The separating wall 30 here exhibits two sections 30a and 30b. Section 30a extends essentially parallel to the floor 24, i.e., transverse to the longitudinal axis X in proximity to the open axial end 26. Proceeding from this section 30a, section 30b extends at an angle relative to the circumferential wall 22 and floor 24. In the area where section 30a of the separating wall 30 extends, the connection area 34 only exhibits a slight axial height in the direction of the longitudinal axis X, which then increases in the area where section 30b of the separating wall 30 extends at an inclination up until the opposing circumferential wall 22. This circumferential wall incorporates a cable bushing 36, through which a connection cable 47 (FIG. 4) can be routed into the connection area 34 inside the terminal box 14. The cable bushing 36 lies opposite the inclined section 30b of the separating wall 30.

The electronics area 32 has situated within it a circuit board 38, which carries electronic components for controlling and/or supplying voltage to the electric motor. For example, these electronic components 40 can contain a voltage transformer. The circuit board 38 extends transversely to the floor 24, essentially parallel to the longitudinal axis X, and reaches through an opening 42 in the separating wall 30. In this way, the circuit board 38 is fixed in place on the separating wall 30. The section 44 of the circuit board 38 that extends through the opening 42 and projects into the connection area 34 forms a plug contact or mating area. Adjacent to this face of the circuit board, the surfaces of the latter accommodate electrical contacts for this purpose, which can engage electrical contacts in the connector plug 20 when the terminal box 14 is placed on the stator casing 2. The section 44 of the circuit board 38 then engages into the connector plug 20 in an electrically contacting manner. In this way, an electrical connection is established between the electrical and electronic components in the electronic area 32 of the terminal box 14 and the electrical and electronic components inside the stator casing 2. In particular, the electrical or electronic components inside the stator casing 2 are arranged on the circuit board 18 or electrically contacted via the latter, for example, the coils. As a consequence, this connection for hooking up the terminal box with the electrical and electronic components inside the stator is formed by the section 44 of the circuit board 38 lying in the connection area 34.

Also situated on the circuit board 38 is a terminal clamp 46, which passes through an opening in the separating wall 30 in such a way that a section 46a of the terminal clamp 46 that incorporates the openings for inserting the conductors of a connection cable 47 (FIG. 4) is located in the connection area 34 or open toward the connection area 34, so that the conductors of the connection cable 47 in the connection area 34 an be introduced into the terminal clamp 46. The terminal clamp 46 additionally exhibits a lever 48, which must be actuated to open the terminal clamp. To this end, this embodiment provides that the lever 48 must be moved in the direction toward the cable bushing 36 to open the terminal clamp 46, i.e., in the direction of arrow A on FIG. 2. The advantage to this is that the terminal box 14 and lever 48 can be gripped with one hand, and the connection cable 47 can be pushed into the terminal box from the other side with the other hand, thereby making it easy to hook up the cable to the terminal clamp 46.

As evident, both the terminal clamp 46 and its section 46a with the openings for inserting a cable along with the mating area formed by the section 44 of the circuit board 38 for connecting the electrical components inside the stator casing 2 are situated in the same connection area 34 inside the terminal box 14. The advantage to this is that the terminal box 14 only has to have one opening, which must be sealed. In order to hook up the connection line 47, the terminal box 14 can just be removed from the stator casing, which then makes the connection area 34 accessible.

For purposes of assembly, the separating wall 30 is initially connected with the circuit board 18, i.e., section 44 of the circuit board 18 is guided through the opening 42. The separating wall 30 is then inserted into the terminal box 14, and there latched to the circumferential wall 22 via snap-in elements 49. This makes it easy to assemble the separating wall 30 with the circuit board 18 inside the terminal box 14.

Also situated in the connection area 34 is a setting element in the form of an adjusting screw 50, with which the motor speed can be set. The adjusting strew 50 is connected with a shaft 52, which extends through section 30a of the separating wall 30 and actuates a potentiometer 54 located on the circuit board 38.

FIG. 3 shows an alternative embodiment of the terminal box 14, which differs from the embodiment described above in that additional operating elements 56 and display elements 58 are arranged in the floor 24'. In addition, a circumferential wall 22 adjoining the electronics area 32 incorporates yet another connector plug 60, which is used to connect a sensor element.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A pumping set comprising:
an impeller (10) that engages into a pump housing; and
an electric drive motor configured to rotate the impeller, the electric drive motor including:
a stator casing (2),
a stator (4) disposed within the stator casing,
stator electrical or electronic components (18) disposed within the stator casing,
a rotor (8) coupled to the impeller and rotated by the stator,
at least one terminal box (14) secured to the stator casing and having an interior space,
at least one separating wall (30) located within the terminal box and dividing the interior space of the terminal box into at least one electronics area (32) and a connection area (34), the connection area (34) having an open side facing the stator casing such that the stator casing closes the open side of the connection area,
electronic components (40) located in the electronics area,
terminal clamps or plug contacts for at least one connection line, the terminal clamps or plug contacts including contact sections for contacting the connection line, the contact sections being located in the connection area, the terminal clamps or plug contacts further extending through the at least one separating wall so as to electrically connect with the electronic components in the electronics area, and
contacts (44) electrically connected to the stator electrical or electronic components in the stator casing, the contacts (44) being arranged in the connection area.

2. The pumping set according to claim 1, wherein the terminal box (14) is secured to an axial face of the stator casing (2).

3. The pumping set according to claim 1, wherein the terminal clamps (46) exhibit a lever (48) for opening the terminal clamps (46), wherein the lever (48) is arranged so that it can be moved toward a cable bushing (36) in a wall (22) of the terminal compartment (34) for opening purposes.

4. The pumping set according to claim 1, wherein the contacts for establishing an electrical connection with the electrical or electronic components (18) inside the stator casing (2) are designed as plug contacts (44), which engage with corresponding plug contacts (20) on the stator or stator casing (2).

5. The pumping set according to claim 1, wherein the connection area (34) adjoins an outer wall (22) of the terminal box (14), which incorporates at least one cable bushing (36).

6. The pumping set according to claim 1, wherein at least one section (30*b*) of the separating wall (30) runs at an inclination to the exterior sides (22, 24) of the terminal box (14).

7. The pumping set according to claim 1, wherein the terminal box (14) is pot-shaped in design.

8. The pumping set according to claim 1, wherein the separating wall (30) is a separate component that is placed in the terminal box (14), and preferably joined with the walls of the terminal box (14) via latching connections.

9. The pumping set according to claim 1, wherein the separating wall (30) carries at least one circuit board (38) arranged in the electronics area (32).

10. The pumping set according to claim 1, wherein the pumping set is designed as a recirculation pumping set.

11. The pumping set according to claim 10, wherein the pumping set is a heating or industrial water recirculation pumping set.

12. The pumping set according to claim 1, wherein the drive motor is a canned motor.

\* \* \* \* \*